US011329996B2

(12) United States Patent
Levy Nahum (10) Patent No.: US 11,329,996 B2
(45) Date of Patent: May 10, 2022

(54) DYNAMIC AGGREGATION OF INFORMATION BASED ON WEB APPLICATION LAYER REQUESTS

(71) Applicant: Imperva, Inc., Redwood City, CA (US)

(72) Inventor: David Levy Nahum, Rehovot (IL)

(73) Assignee: Imperva, Inc., San Mateo, CA (US)

( * ) Notice: Subject to any disclaimer, the term of this patent is extended or adjusted under 35 U.S.C. 154(b) by 175 days.

(21) Appl. No.: 16/554,228

(22) Filed: Aug. 28, 2019

(65) Prior Publication Data
US 2021/0067543 A1 Mar. 4, 2021

(51) Int. Cl.
*H04L 29/06* (2006.01)
*H04L 67/5682* (2022.01)
*H04L 67/566* (2022.01)
*H04W 24/08* (2009.01)

(52) U.S. Cl.
CPC ........ *H04L 63/126* (2013.01); *H04L 63/1441* (2013.01); *H04L 63/166* (2013.01); *H04L 67/2833* (2013.01); *H04L 67/2852* (2013.01); *H04W 24/08* (2013.01); *H04L 63/0236* (2013.01); *H04L 63/0263* (2013.01); *H04L 2463/146* (2013.01)

(58) Field of Classification Search
CPC ............... H04L 63/126; H04L 63/0236; H04L 63/0263; H04W 24/08
See application file for complete search history.

(56) References Cited

U.S. PATENT DOCUMENTS 8,676,127 B2 * 3/2014 Stalnacke ............. H04W 24/08
455/63.1
2021/0036991 A1 * 2/2021 Owens .................. H04L 63/126

* cited by examiner

*Primary Examiner* — Kyung H Shin
(74) *Attorney, Agent, or Firm* — Nicholson, De Vos, Webster & Elliott, LLP (57) ABSTRACT

A method by a web application layer proxy for dynamically creating counters during runtime based on actual web application layer requests received by the web application layer proxy. The method includes installing a counting rule in the web application layer proxy, where the counting rule specifies a set of parameters based upon which to create counters, receiving a web application layer request generated by a web application client that is intended for a web application server, determining a set of parameter values associated with the web application layer request that corresponds to the set of parameters specified by the counting rule, and creating a counter associated with the set of parameter values associated with the web application layer request in response to a determination that a counter associated with the set of parameter values associated with the web application layer request does not exist.

17 Claims, 5 Drawing Sheets

SECURITY RULES 180

| ID | CONDITION | ACTION(S) |
|---|---|---|
| 1000 | COUNTER CREATED BASED ON COUNTING RULE "CR_1" WHERE ORIGIN GEOLOCATION = "CHINA" AND HTTP/HTTPS = "HTTP" IS GREATER THAN 200 | SEND CAPTCHA |
| 1001 | COUNTER CREATED BASED ON COUNTING RULE "CR_1" WHERE ORIGIN GEOLOCATION = "USA" AND HTTP/HTTPS = "HTTPS" IS GREATER THAN 1,000 | BLOCK |
| 1002 | COUNTER CREATED BASED ON COUNTING RULE "CR_2" IS GREATER THAN 10,000 | GENERATE ALERT |
| ... | ... | ... |

SECURITY RULE 180A → row 1000
SECURITY RULE 180B → row 1001
SECURITY RULE 180C → row 1002

DYNAMIC AGGREGATION OF INFORMATION BASED ON WEB APPLICATION LAYER REQUESTS

TECHNICAL FIELD

Embodiments of the invention relate to the field of computer networks, and more specifically, to dynamically creating traffic counters during runtime based on actual web application layer requests received by a web application layer proxy.

BACKGROUND

A web application server is system software (e.g., running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application layer responses (e.g., HTTP response messages) responsive to web application layer request messages (e.g., HTTP request messages) sent by those web application clients.

Web applications clients interact with web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients (e.g., using the rendering engine of a web browser). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

A web application layer proxy may be deployed between web application clients and web application servers to provide various functions such as content caching, traffic scrubbing, Internet Protocol (IP) address masking, load balancing, and security analysis. The web application layer proxy may establish connections with the web application clients and receive web application layer requests (e.g., HTTP request messages) intended for the web application servers from the web application clients over those connections. The web application layer proxy may also establish connections with the web application servers and send the web application layer requests received from the web application clients to the web application servers (e.g., if it determines that the web application layer requests do not pose a security threat).

A web application layer proxy may collect various statistics of the traffic being sent between the web application clients and the web application server, which may include traffic counters for traffic having specifically defined parameter values. For example, a web application layer proxy may be configured to count the number of web application layer requests it receives that originate from a specified source Internet Protocol (IP) address and are destined for a specified destination IP address. However, such approach to collecting statistics has limitations in a real-time system such as a web application layer proxy, as it is difficult to determine the exact parameter values of the traffic to count in advance (e.g., the specific source IP address and destination IP address of the traffic to count), and at the same time it is impractical, and often infeasible, to create counters for every possible combination of parameter values (e.g., creating a counter for every possible combination of source IP address and destination IP address).

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As mentioned above, a web application layer proxy may collect various statistics of the traffic being sent between the web application clients and the web application server, which may include traffic counters (sometimes referred to herein simply as "counters") for traffic having specifically defined parameter values. For example, a web application layer proxy may be configured to count the number of web application layer requests it receives that originate from a specified source Internet Protocol (IP) address and are destined for a specified destination IP address. However, such approach to collecting statistics has limitations in a real-time system such as a web application layer proxy, as it is difficult to determine the exact parameter values of the traffic to count in advance (e.g., the specific source IP address and destination IP address of the traffic to count), and at the same time it is impractical, and often infeasible, to create counters for every possible combination of parameter values (e.g., creating a counter for every possible combination of source IP address and destination IP address).

Embodiments disclosed herein provide a mechanism for dynamically creating counters based on actual traffic sent between web application clients and web application servers. According to some embodiments, a web application layer proxy installs a counting rule, where the counting rule specifies a set of parameters based upon which to create counters. When the web application layer proxy receives a web application layer request generated by a web application client that is intended for a web application server, it determines a set of parameter values associated with the web application layer request that corresponds to the set of parameters specified by the counting rule. The web application layer proxy then determines whether a counter associated with the set of parameter values associated with the web application layer request exists. If not, the web application layer proxy creates a counter associated with the set of parameter values associated with the web application layer request. Otherwise, if a counter associated with the set of parameter values associated with the web application layer request already exists, then the web application layer proxy updates that counter. Such approach allows for dynamically creating counters during runtime without having to specify the actual parameter values of the traffic to count in advance and without having to create counters for every possible combination of parameter values. Various embodiments are further described herein with reference to the accompanying figures.

Figure 1:
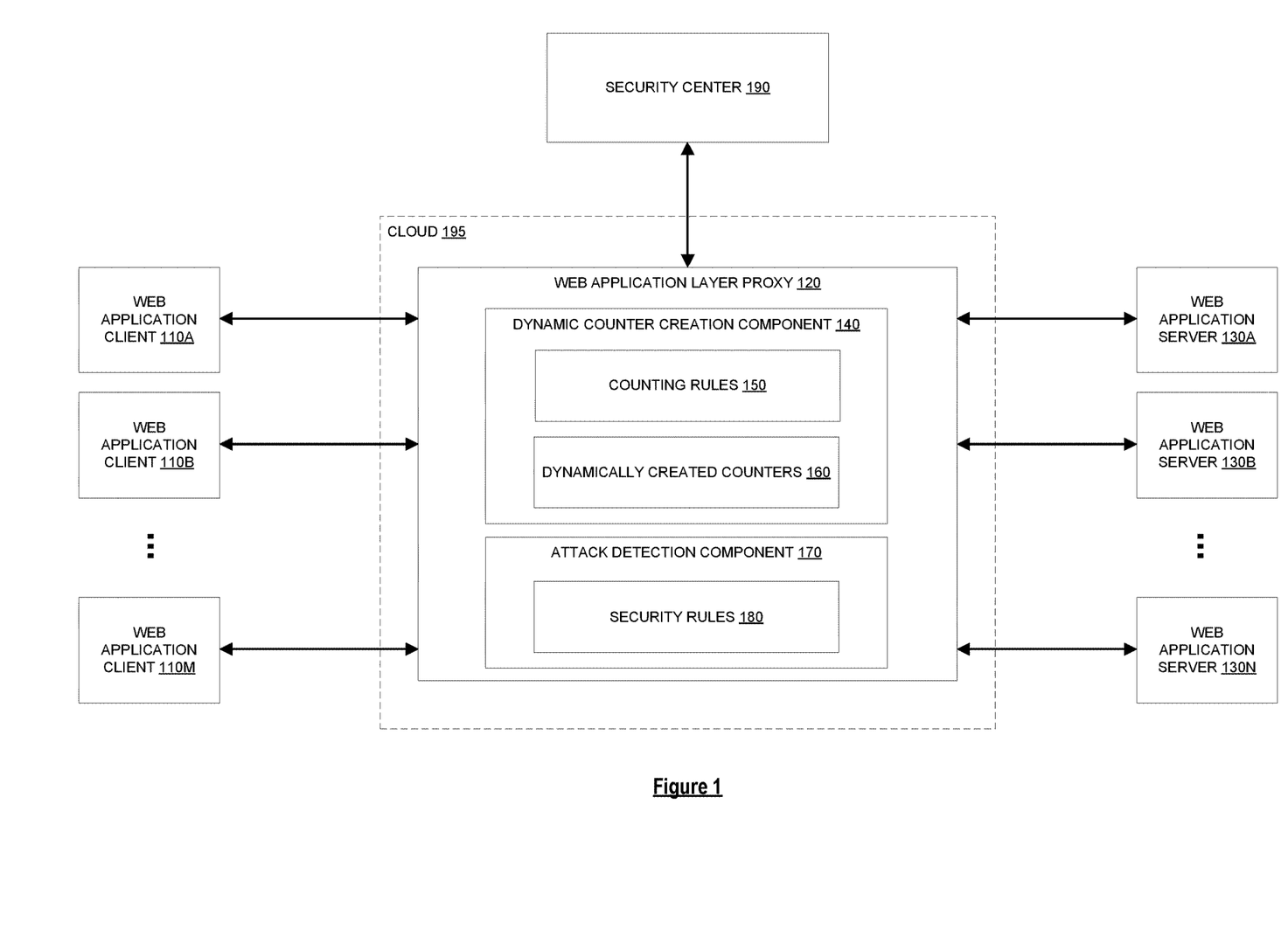
FIG. 1 is a block diagram illustrating a system for dynamically creating counters based on actual traffic, according to some embodiments.

FIG. 1 is a block diagram illustrating a system for dynamically creating counters based on actual traffic, according to some embodiments. As illustrated in the diagram, the system includes web application clients 110A-M, web application servers 130A-N, a web application layer proxy 120 communicatively coupled between the web application clients 110 and the web application servers 130, and a security center 190 communicatively coupled to the web application layer proxy 120.

As used herein, a web application client 110 is an application that can access the content and/or services provided by a web application server 130 (e.g., HyperText Transfer Protocol (HTTP) clients such as web browsers). As used herein, a web application server 130 is an application that provides content or services (e.g., provides web pages or other type of content/services) upon the request of web application clients 110. Each of the web application clients 110 and the web application servers 130 may be implemented by one or more electronic/network devices.

Each of the web application clients 110 may generate one or more web application layer requests (e.g., Hypertext Transfer Protocol (HTTP) request messages such as a "POST" HTTP request messages or "GET" HTTP request messages) and send these web application layer requests to the web application servers 130. In response to receiving web application layer requests, the web application servers 130 may send corresponding web application layer responses (e.g., HTTP response messages) to the web application clients 110. The web application clients 110 may then render the contents of the web application layer responses (e.g., on a display screen for an end user) or otherwise utilize the contents of the web application layer responses.

The web application layer proxy 120 acts as an intermediary between the web application clients 110 and the web application servers 130 and may provide various functions depending on the implementation such as content caching, traffic scrubbing, Internet Protocol (IP) address masking, load balancing, security analysis, or any combination thereof. The web application layer proxy 120 may establish connections with the web application clients 110 and receive web application layer requests (e.g., HTTP request messages) intended for the web application servers 130 from the web application clients 110 over those connections. The web application layer proxy 120 may also establish connections with the web application servers 130 and send web application layer requests received from the web application clients 110 to the web application servers 130 over those connections. Thus, the web application layer proxy 120 may 120 sit inline to the traffic being sent between the web application clients 110 and the web application servers 130 such that it can see the traffic being sent between them. In one embodiment, the web application layer proxy 120 is a web application firewall that protects the web application servers 130 against web application layer attacks from the web application clients 110. In such an embodiment, the web application layer proxy 120 may protect the web application server 130 against a variety of attacks including, but not limited to, Structured Query Language injection (SQLi) attacks, Cross-Site Request Forgery (CSRF) attacks, and Remote File Inclusion (RFI) Attacks (e.g., based on applying security rules). The web application layer proxy 120 may be implemented by one or more electronic/network devices.

While the diagram shows that system as including a single web application layer proxy 120, in some embodiments the system may include multiple web application layer proxies 120 (e.g., that are geographically dispersed), which are communicatively coupled between the web application clients 110 and the web application servers 130. Also, while the diagram shows an inline deployment (the web application layer proxy 120 is sitting inline to the traffic between the web application clients 110 and the web application servers 130), it should be understood that the dynamic counter creation mechanisms described herein can also be implemented in non-inline deployments (e.g., a system that includes a security device that sniffs traffic being sent between the web application clients 110 and the web application servers 130).

The security center 190 represents a device or entity that is responsible for managing the security policies for the web application layer proxy 120. For example, the security center 190 may configure the web application layer proxy 120 with a set of counting rules 150 that specify the parameters based upon which the web application layer proxy 120 is to create counters for and/or a set of security rules 180 that the web application layer proxy 120 is to apply to traffic. Counting rules and security rules are further described herein below. The security center 190 may also receive various traffic statistics (e.g., counters) and alerts generated by the web application layer proxy 120 and analyze these statistics and/or alerts for security threats.

As shown in the diagram, the web application layer proxy 120 includes a dynamic counter creation component 140. As will be described in additional detail herein below, the dynamic counter creation component 140 may dynamically create counters during runtime of the web application layer proxy 120 based on actual web application layer requests received by the web application layer proxy 120. The dynamic counter creation component 140 includes a set of counting rules 150, where each counting rule in the set of counting rules 150 specifies a set of parameters based upon which to create counters 160. For example, a counting rule may specify a set of parameters that include any combination one or more of the following parameters: system site ID, system account ID, ID of the HTTP session, security defined client signature, country code (e.g., US, IL, etc.), the declared client application according to the User-Agent header, uniform resource locator (URL), destination IP address, destination port, User-Agent HTTP header, Referer HTTP header, client IP address, client application type defined by security (e.g., browser, search bot, worm, etc.), HTTP method (e.g., HTTP GET, POST, PUT, DELETE, etc.), an HTTP parameter, Completely Automated Public Turing test to tell Computers and Humans Apart (CAPTCHA) state (e.g., whether the CAPTCHA passed or did not pass), JavaScript state (e.g., whether JavaScript challenge passed or did not pass), cookie state (whether cookie challenge passed or did not pass), Secure Socket Layer (SSL) cipher (e.g., ECDHE-RSA-AE128-GCM-SHA256), request result (e.g., blocked by access control list (ACL), all IPs down, blocked session, etc.), HTTP status code, point of presence (PoP) or datacenter name, SSL version, existence of an HTTP parameter, proxy machine ID (e.g., ID of web application layer proxy 120), HTTP version (e.g., 1.0, 1.1, 2, etc.), IP version (IPv4 or IPv6), autonomous system number, source port, Transport Layer Security (TLS) fingerprint, and device fingerprint. In one embodiment, the security center 190 provides the set of counting rules 150 to the dynamic counter creation component 140 (this can be done during runtime (while the web application layer proxy 120 is in operation) and/or before runtime).

In one embodiment, when the web application proxy 120 receives a web application layer request (e.g., from one of the web application clients 110), the dynamic counter creation component 140 applies each counting rule in the set of counting rules 150 to that web application layer request to create/update counters in the set of dynamically created counters 160. The dynamic counter creation component 140 may apply a given counting rule to a web application layer request by determining the set of parameter values associated with the web application layer request that corresponds to the set of parameters specified by that counting rule. The dynamic counter creation component 140 then determines whether a counter associated with that set of parameter values already exists in the set of dynamically created counters 160 (because it has previously been created). If the counter already exists, then the dynamic counter creation component 140 updates that counter (e.g., increments the counter) in the set of dynamically created counters 160. Otherwise, if the counter does not exist, then the dynamic counter creation component 140 creates a new counter associated with the set of parameter values associated with the web application layer request and adds it to the set of dynamically created counters 160. In one embodiment, a counter associated with a set of parameter values represents the number of web application layer requests received that are associated with that set of parameter values. In other embodiments, the counter may represent the number of bytes received (of web application layer requests that are associated with that set of parameter values) or similar metric.

As an example, assume that the set of counting rules 150 includes a first counting rule that specifies the origin geolocation parameter and the HTTP/HTTPS parameter as the set of parameters for that counting rule and a second counting rule that specifies the client type parameter, origin geolocation parameter, and destination IP address parameter as the set of parameters for that counting rule. The dynamic counter creation component 140 may apply the first counting rule to a web application layer request by determining the origin geolocation of the web application layer request (e.g., which may be determined based on mapping the source IP address to a geographical location) and whether the web application layer request was sent using HTTP (HyperText Transfer Protocol) or HTTPS (HyperText Transfer Protocol Secure). For example, the dynamic counter creation component 140 may determine that the origin geolocation of the web application layer request is China and that the web application layer request was sent using HTTP (as opposed to HTTPS). The dynamic counter creation component 140 may then determine whether a counter associated with this set of parameter values exists in the set of dynamically created counters 160. If such a counter already exists in the set of dynamically created counters 160, then the dynamic counter creation component 140 updates the counter (e.g., increments the counter). Otherwise, if such a counter does not exist in the set of dynamically create counters 160, then the dynamic counter creation component 140 may create a new counter associated with this set of parameter values. For example, the dynamic counter creation component 140 may create a counter associated with the origin geolocation parameter set to China and the HTTP/HTTPS parameter set to HTTP. The dynamic counter creation component 140 may then set the counter to an initial value (e.g., 1).

The dynamic counter creation component 140 may apply the second counting rule to the web application layer request in a similar manner but with respect to the set of parameters specified by the second counting rule. For example, the dynamic counter creation component 140 may apply the second counting rule to the web application layer request by determining the client type associated with the web application layer request, the origin geolocation of the web application layer request, and the destination IP address associated with the web application layer request. For example, the dynamic counter creation component 140 may determine that the client type associated with the web application layer request is Mozilla, the origin geolocation of the web application layer request is China, and the destination IP address associated with the web application layer request is 209.85.231.104. The dynamic counter creation component 140 may then determine whether a counter associated with this set of parameter values exists in the set of dynamically created counters 160. If such a counter already exists in the set of dynamically created counters 160, then the dynamic counter creation component 140 updates the counter (e.g., increments the counter). Otherwise, if such a counter does not exist in the set of dynamically create counters 160, then the dynamic counter creation component 140 may create a new counter associated with this set of parameter values. For example, the dynamic counter creation component 140 may create a counter associated with the client type parameter set to Mozilla, the origin geolocation parameter set to China, and the destination IP address parameter set to 209.85.231.104. The dynamic counter creation component 140 may then set the counter to an initial value (e.g., 1).

The dynamic counter creation component 140 may perform similar operations as described above with respect to the first counting rule and the second counting rule for each of the other counting rules in the set of counting rules 150 (if any) but with respect to the set of parameters specified by that counting rule. In one embodiment, if the same parameter is specified by multiple counting rules, then the dynamic counter creation component 140 only determines the parameter value corresponding to that parameter once. For example, in the example given above, the dynamic counter creation component 140 may only determine the origin geolocation of the web application layer request once even though the origin geolocation parameter is specified by both the first counting rule and the second counting rule. This may be achieved, for example, by storing the parameter values associated with the web application layer request as they are determined and accessing the stored parameter value when the dynamic counter creation component 140 encounters the same parameter in another counting rule. Parameters that are specific to web application layer requests may be determined once per web application layer request. Environmental parameters such as proxy ID may be determined just once. This may help improve computational efficiency by avoiding redundant computations.

The dynamic counter creation component 140 may also apply the set of counting rules 150 to each subsequent web application layer request it receives. For example, if the web application layer proxy 120 receives a subsequent web application layer request and the dynamic counter creation component 140 determines, based on applying the first counting rule to the web application layer request, that the origin geolocation of the web application layer request is China and the web application layer request was sent using HTTP (as opposed to HTTPS), then the dynamic counter creation component 140 may update the counter associated with that set of parameter values (since the counter already exists). However, if the web application layer proxy 120 receives a subsequent web application layer request and the dynamic counter creation component 140 determines that the origin geolocation of the web application layer request is the United States and the web application layer was sent using HTTPS, then the dynamic counter creation component 140 may create a new counter associated with this set of parameter values (since the counter does not exist). Thus, the dynamic counter creation component 140 may create a counter for each unique set of parameter values seen in actual traffic being sent between the web application clients 110 and the web application servers 130.

In one embodiment, the web application layer proxy 120 provides the set of dynamically created counters 160 to the security center 190 for analysis. The web application layer proxy 120 may provide the set of dynamically created counters 160 to the security center 190 periodically (e.g., every N minutes), provide certain counters to the security center 190 when they reach a predefined threshold value, provide certain counters to the security center 190 in response to receiving a request from the security center 190, and/or provide certain counters to the security center 190 in response to the occurrence of certain events (e.g., upon a security rule being triggered). The security center 190 may analyze the counters provided by the web application layer proxy 120 to gain insight into the traffic that is being sent between the web application clients 110 and the web application servers 130.

As shown in the diagram, in one embodiment, the web application layer proxy 120 includes an attack detection component 170 that applies a set of security rules 180 to the traffic received by the web application layer proxy 120 to enforce security policies. Each security rule in the set of security rules 180 may specify a set of conditions that trigger the security rule and a set of actions to be performed when the security rule is triggered. The set of conditions may specify particular header field values (e.g., source IP address, source port, destination IP address, and/or destination port in a TCP header or referrer field in a HTTP header), metrics (e.g., a particular number of packets or web application layer messages that are received over a defined period of time), and/or values of portions of application layer data (e.g., certain text values appearing in the body of a HTTP request). The set of actions may include blocking the traffic, generating an alert (e.g., to notify the security center 190), and/or sending a CAPTCHA (e.g., to the web application client 110 that generated the web application layer request that caused the security rule to be triggered). In one embodiment, the security center 190 provides the set of security rules 180 to the attack detection component 170 (this can be done during runtime (while the web application layer proxy 120 is in operation) and/or before runtime).

In one embodiment, a security rule may refer to one or more of the dynamically created counters in the set of dynamically created counters 160. For this purpose, in one embodiment, each of the counting rules in the set of counting rules 150 is assigned a unique name/ID to allow security rules to refer to the counters that were created based on that counting rule. For example, continuing with the example given above, the first counting rule (that specifies the origin geolocation parameter and the HTTP/HTTPS parameter as the set of parameters) may be assigned the name/ID "CR_1" and the second counting rule (that specifies the client type parameter, the origin geolocation parameter, and the destination IP address parameter as the set of parameters) may be assigned the name/ID "CR_2." A security rule may refer to one or more counters created based on that counting rule using the name assigned to that counting rule (i.e., "CR_1"). For example, a security rule may specify a condition that a counter created based on counting rule "CR_1" has a count greater than 10,000 and a corresponding action to block any web application layer requests. The attack detection component 170 may apply this security rule by blocking a web application layer request if a web application layer request causes a counter created based on counting rule "CR_1" to be greater than 10,000. In one embodiment, the web application layer proxy 120 executes the dynamic counter creation component 140 using a thread that is different from the thread that is used for executing the attack detection component 170 (e.g., to avoid disruption of the functioning of the attack detection component 170 (whose functionality may be deemed more important than the functionality of the dynamic counter creation component 140)).

One or more components of the system may be deployed in a cloud (e.g., a cloud provided by a cloud provider such as Amazon®, Microsoft®, etc.) and/or on premise (e.g., in an enterprise network). In an exemplary arrangement, the web application layer proxy 120 is deployed in the cloud 195 while the web application servers 130 are deployed on-premise, and any web application layer requests originated by the web application clients 110 that are intended for the web application servers 130 are first directed to the web application layer proxy 120 in the cloud 195 (e.g., by changing Domain Name Service (DNS) records) before being sent to the on-premise web application servers 130. It should be understood that other arrangements are also possible. For example, both the web application layer proxy 120 and the web application servers 130 may be deployed in the cloud or both may be deployed on-premise. In one embodiment, the security center 190 is deployed in a cloud (which may be the same or different cloud than the cloud 195 in which the web application layer proxy 120 is deployed).

Figure 2:
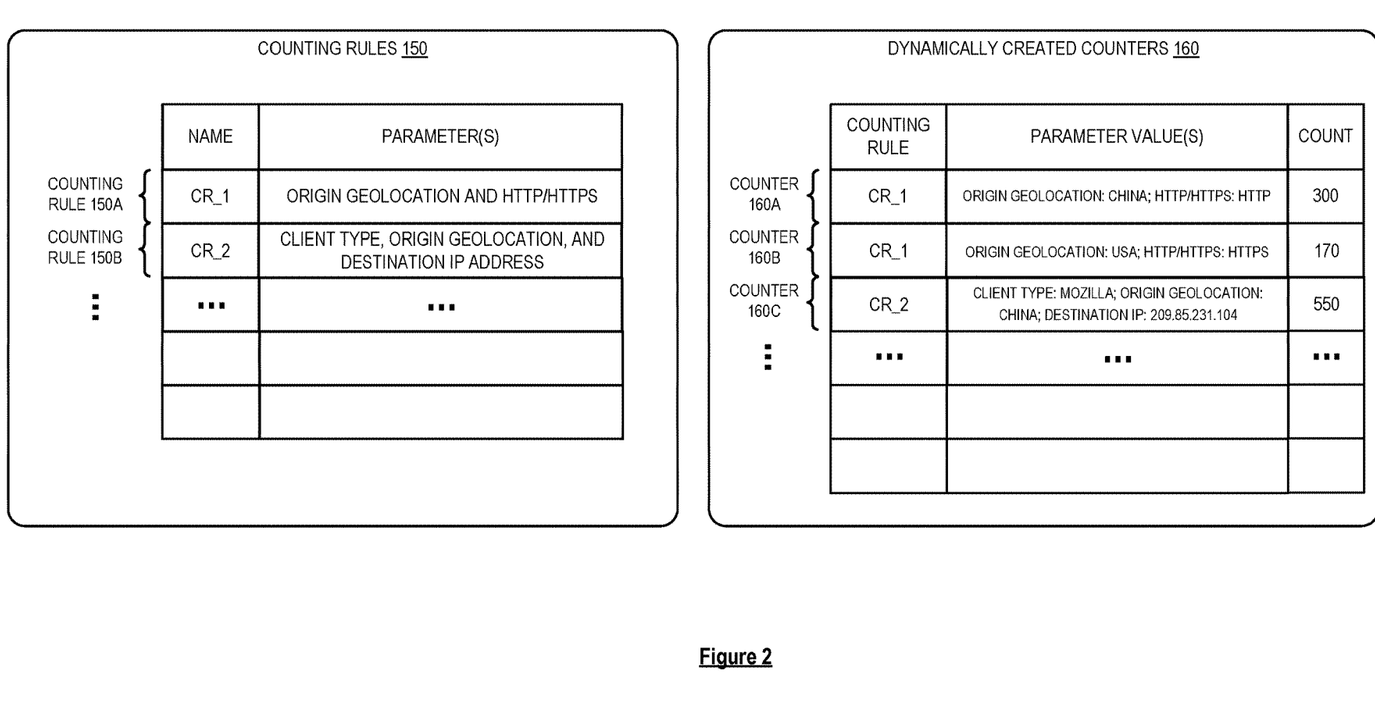
FIG. 2 is a diagram illustrating exemplary counting rules and counters created based on those counting rules, according to some embodiments.

FIG. 2 is a diagram illustrating exemplary counting rules and counters created based on those counting rules, according to some embodiments. As shown in the diagram, the set of counting rules 150 includes, among other counting rules, counting rule 150A and counting rule 150B. Counting rule 150A is assigned the name/ID "CR_1" and specifies the origin geolocation parameter and HTTP/HTTPS parameter as parameters. Counting rule 150B is assigned the name/ID "CR_2" and specifies the client type parameter, the origin geolocation parameter, and the destination IP address parameter as parameters.

The set of dynamically created counters 160 includes counter 160A, counter 160B, and counter 160C. Each of the counters in the set of dynamically created counters 160 may have been created based on one of the counting rules in the set of counting rules 150 (based on applying the counting rule to a web application layer request received by the web application layer proxy 120). As shown in the diagram, counter 160A is a counter created based on counting rule 150A ("CR_1") and is associated with the origin geolocation parameter set to China and the HTTP/HTTPS parameter set to HTTP. The current count for this counter is 300, which indicates that the web application layer proxy 120 has received 300 web application layer requests that are associated with these parameter values (i.e., web application layer requests originating from China and using HTTP). Counter 160B is also a counter created based on counting rule 150A ("CR_1") and is associated with the origin geolocation set to USA and the HTTP/HTTPS parameter set to HTTPS. The current count for this counter is 170, which indicates that the web application layer proxy 120 has received 170 web application layer requests that are associated with these parameter values (i.e., web application layer requests originating from USA and using HTTPS). Counter 160C is a counter created based on counting rule 150B ("CR_2") and is associated with the client type parameter set to Mozilla, the origin geolocation parameter set to China, and the destination IP address parameter set to 209.85.231.104. The current count for this counter is 550, which indicates that the web application layer proxy 120 has received 550 web application layer requests associated with these parameter values (i.e., web application layer requests generated by a Mozilla web browser, originating from China, and destined to IP address 209.85.231.104).

In one embodiment, the set of dynamically created counters 160 is stored in a hash table using a key that is generated based on the set of parameter values associated with the respective counters. This allows the dynamic counter creation component 140 to quickly determine whether a counter exists and to quickly access existing counters.

Figure 3:
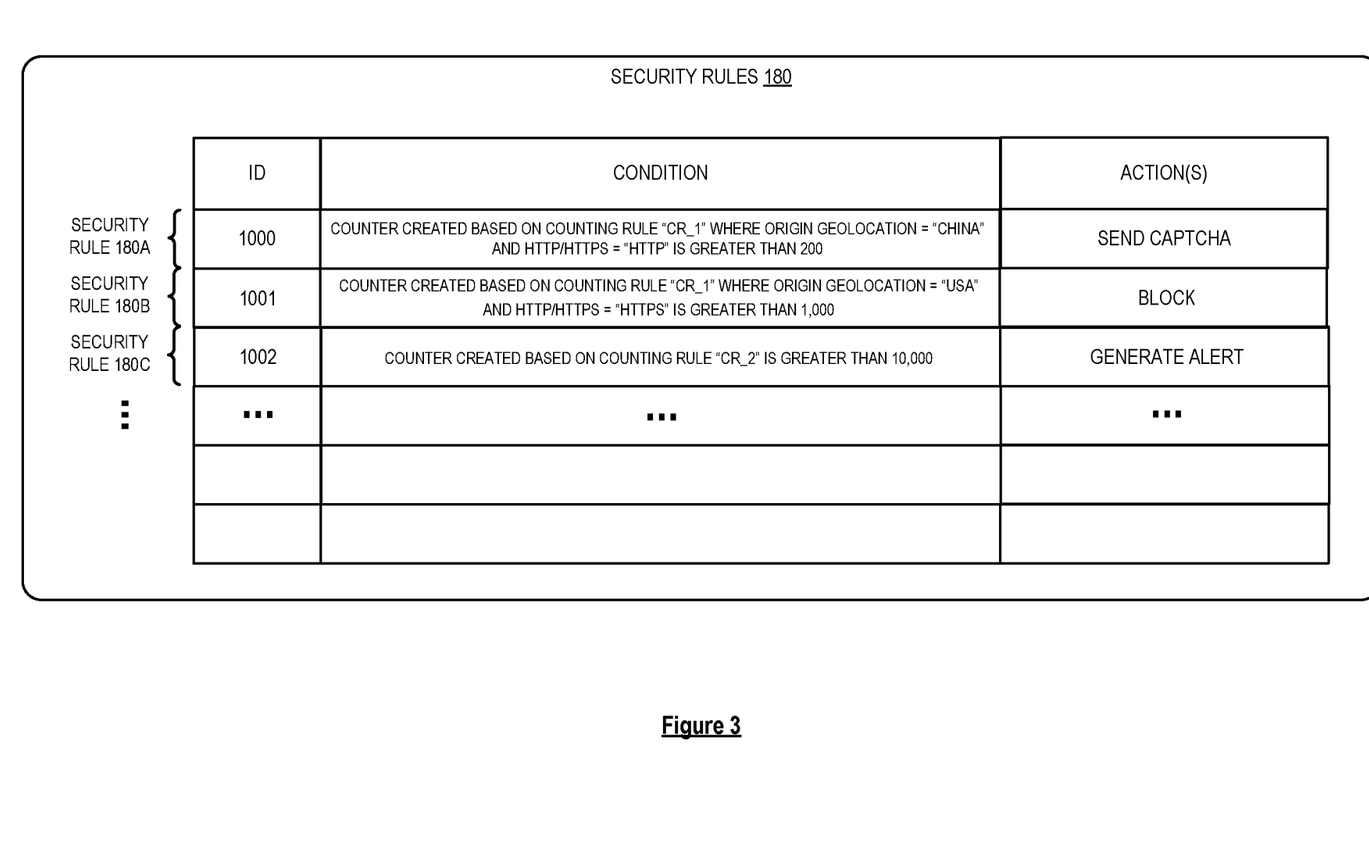
FIG. 3 is a diagram illustrating exemplary security rules that refer to dynamically created counters, according to some embodiments.

FIG. 3 is a diagram illustrating exemplary security rules that refer to dynamically created counters, according to some embodiments. As shown in the diagram, the set of security rules 180 includes, among other security rules, security rule 180A, security rule 180B, and security rule 180C. Security rule 180A is assigned ID 1000 and specifies a condition that the counter created based on counting rule "CR_1" and associated with the origin geolocation parameter set to China and the HTTP/HTTPS parameter set to HTTP is greater than 200. Security rule 180A further specifies a corresponding action to send a CAPTCHA. The attack detection component 170 may apply this security rule 180A by sending a CAPTCHA if the web application layer proxy 120 receives a web application layer request that causes the specified counter (e.g., counter 160A) to be greater than 200. Security rule 180B is assigned ID 1001. Security rule 180B specifies a condition that the counter created based on counting rule "CR_1" and associated with the origin geolocation parameter set to USA and the HTTP/HTTPS parameter set to HTTP is greater than 1,000. Security rule 180B further specifies a corresponding action to block the request. The attack detection component 170 may apply this security rule 180B by blocking a web application layer request received by the web application layer proxy 120 if it causes the specified counter (e.g., counter 160B) to be greater than 1,000. Security rule 180C is identified using ID 1002. Security rule 180C specifies a condition that any counter created based on counting rule "CR_2" is greater than 10,000. Security rule 180C further specifies a corresponding action to generate an alert. The attack detection component 170 may apply this security rule 180A by generating an alert (e.g., to the security center 190) if the web application layer proxy 120 receives a web application layer request that causes any of the counters created based on counting rule "CR_2" (e.g., counter 160C) to be greater than 10,000. In one embodiment, the web application layer proxy 120 keeps track of the rate at which a counter changes over a defined period of time. In such an embodiment, a security rule may specify the rate of change as a condition of a security rule (e.g., specify a condition that the rate of change of a particular counter exceeds a threshold value).

Figure 4:
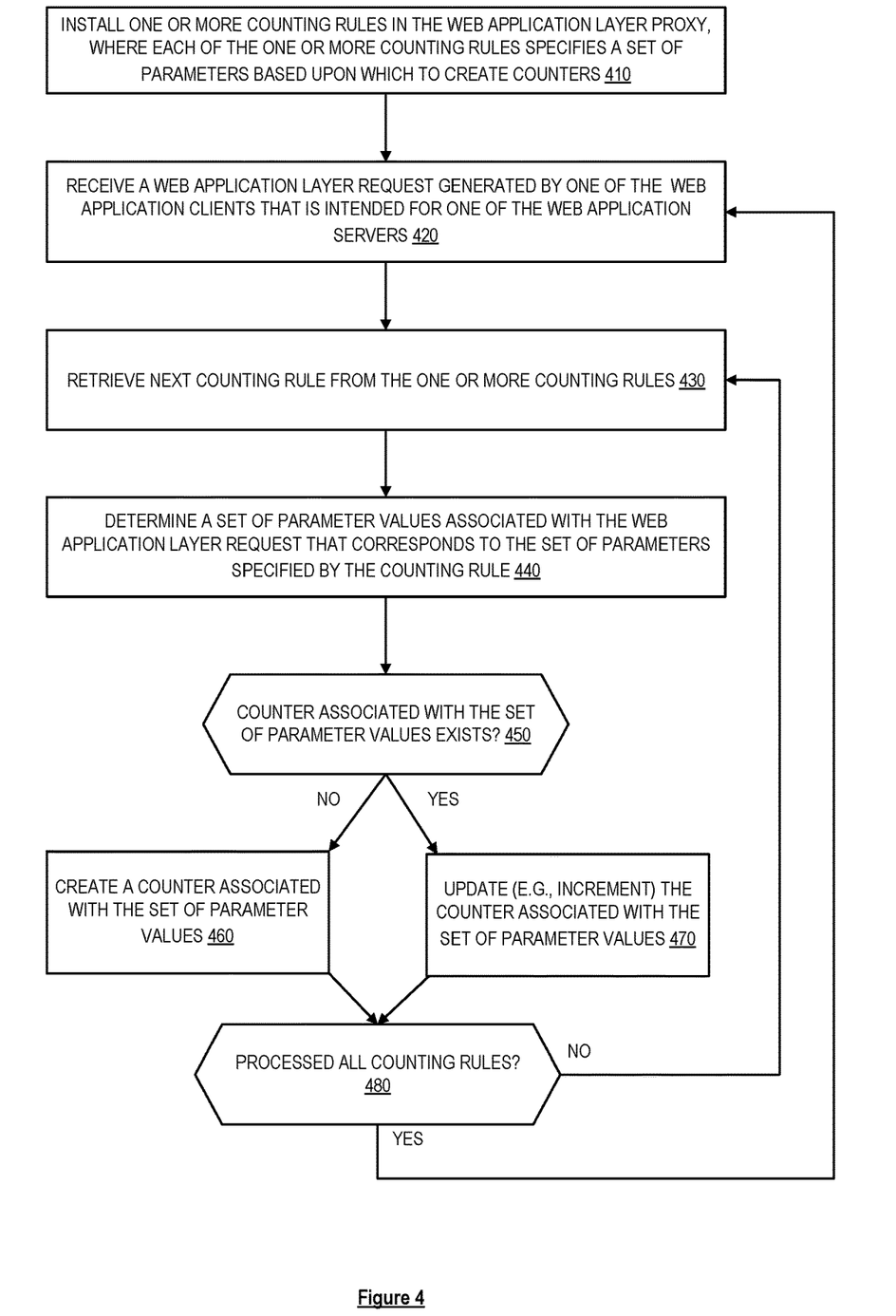
FIG. 4 is a flow diagram of a process for dynamically creating counters based on actual traffic, according to some embodiments.

FIG. 4 is a flow diagram of a process for dynamically creating counters based on actual traffic, according to some embodiments. In one embodiment, the process is implemented by a web application layer proxy that is communicatively coupled between web application clients and web application servers. While the flow diagram is described in a context where the process is implemented by a web application layer proxy, it should be understood that the process may be implemented by a different functional entity or a combination of functional entities. The process may be implemented using hardware, software, firmware, or any combination thereof.

At block 410, the web application layer proxy installs one or more counting rules in the web application layer proxy, where each of the one or more counting rules specifies a set of parameters based upon which to create counters. In one embodiment, the set of parameters specified by a counting rule includes at least one of: site ID, origin geolocation, destination geolocation, client type, proxy ID, SSL version, attack type, security rule ID, and PoP (Point of Presence) name. In one embodiment, different counting rules specify different sets of parameters. In one embodiment, the web application layer proxy installs a counting rule in response to receiving a request (e.g., from a security center or security administrator) to install the counting rule. In one embodiment, the counting rule is installed while the web application layer proxy is in operation.

At block 420, the web application layer proxy receives a web application layer request generated by one of the web application clients that is intended for one of the web application servers.

At block 430, the web application layer proxy retrieves the next counting rule from the one or more counting rules.

At block 440, the web application layer proxy determines a set of parameter values associated with the web application layer request that corresponds to the set of parameters specified by the counting rule. In one embodiment, a parameter value in the set of parameter values associated with the web application layer request is only determined once for the web application layer request even when the parameter corresponding to the parameter value is specified by multiple counting rules.

At decision block 450, the web application layer proxy determines whether a counter associated with the set of parameter values exists. If the counter does not exist, then at block 460, the web application layer proxy creates a counter associated with the set of parameter values. Otherwise, if the counter already exists, then at block 470, the web application layer proxy updates (e.g., increments) the existing counter. In one embodiment, the counter is stored in a hash table using a key that is generated based on the set of parameter values associated with the counter.

At decision block 480, the web application layer proxy 480 determines whether all counting rules have been processed. If all of the counting rules have not been processed, then the process proceeds to block 430 where the web application layer proxy retrieves the next counting rule and repeats blocks 440-480 for this counting rule. The web application layer proxy 120 may continue to process counting rules in this manner until it has processed all of the counting rules. Returning to decision block 480, if the web application layer proxy determines that it has processed all of the counting rules then the process proceeds to block 420, where the web application layer proxy receives another web application layer request. The web application layer proxy may repeat blocks 430-480 for this web application layer request. The web application layer proxy may continue to process web application layer requests in this manner as it receives them.

In one embodiment, as described above, the web application layer proxy provides one or more counters that were created based on the one or more counting rules to a security center for analysis.

In one embodiment, the web application layer proxy installs a security rule, where the security rule refers to one or more counters that were created based on a counting rule using a name assigned to that counting rule.

In one embodiment, one or more of the operations of blocks 430-480 are performed using a thread running on the web application layer proxy that is different from a thread of the web application layer proxy that applies security rules.

While various embodiments are described in a context of a web application layer proxy that receives web application layer requests generated by web application clients and destined for web application servers, it should be understood that this is by way of example and not intended to be limiting. It should be understood that the dynamic counter creation mechanisms disclosed herein can be applied in other contexts to dynamically create counters for other types of traffic (e.g., database traffic, file server traffic, etc.).

Figure 5:
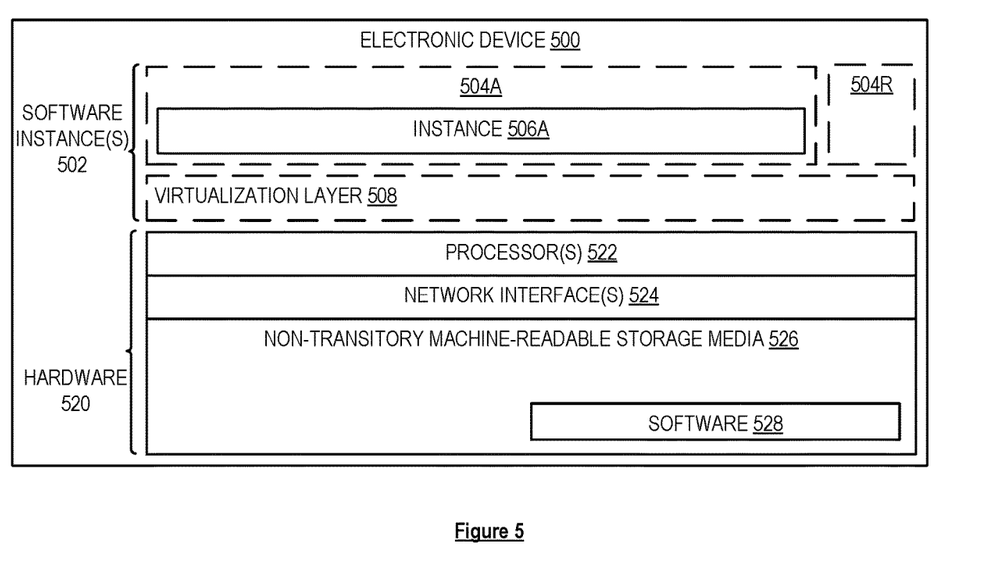
FIG. 5 is a block diagram illustrating an electronic device, according to some embodiments.

FIG. 5 is a block diagram illustrating an electronic device, according to some embodiments. FIG. 5 illustrates hardware 520 comprising a set of one or more processor(s) 522, a set of one or more network interfaces 524 (wireless and/or wired), and non-transitory machine-readable storage medium/media 526 having stored therein software 528 (which includes instructions executable by the set of one or more processor(s) 522). Software 528 can include code, which when executed by hardware 520, causes the electronic device 500 to perform operations of one or more embodiments described herein. Thus, as previously described, the web application layer proxy 120 and/or the web application servers 130 may be implemented in one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices implementing a web application layer proxy for dynamically creating counters during runtime based on actual web application layer requests received by the web application layer proxy, wherein the web application layer proxy is communicatively coupled between one or more web application clients and one or more web application servers, the method comprising:
    installing a first counting rule in the web application layer proxy, wherein the first counting rule specifies a set of parameters based upon which to create counters, wherein the set of parameters includes a plurality of parameters;
    receiving a first web application layer request generated by one of the one or more web application clients that is intended for one of the one or more web application servers;
    determining a set of parameter values associated with the first web application layer request that corresponds to the set of parameters specified by the first counting rule;
    creating a first counter associated with the set of parameter values associated with the first web application layer request in response to a determination that a counter associated with the set of parameter values associated with the first web application layer request does not exist; and
    installing a security rule in the web application layer proxy, wherein the security rule specifies a condition that any single counter created based on the first counting rule exceeds a threshold value and specifies a corresponding action to perform if the condition is satisfied, wherein the condition refers to the first counting rule using a name assigned to the first counting rule.

2. The method of claim 1, further comprising:
    receiving a second web application layer request generated by one of the one or more web application clients that is intended for one of the one or more web application servers;

determining a set of parameter values associated with the second web application layer request that corresponds to the set of parameters specified by the first counting rule; and updating the first counter in response to a determination that the set of parameter values associated with the second web application layer request is the same as the set of parameter values associated with the first counter or creating a second counter associated with the set of parameter values associated with the second web application layer request in response to a determination that a counter associated with the set of parameter values associated with the second web application layer request does not exist.

3. The method of claim 1, further comprising:
providing one or more counters that were created based on the first counting rule, including the first counter, to a security center for analysis.

4. The method of claim 1, wherein the set of parameters specified by the first counting rule includes one or more of: site ID, origin geolocation, destination geolocation, client type, proxy ID, Secure Sockets Layer (SSL) version, attack type, security rule ID, and point of presence (PoP) name.

5. The method of claim 1, further comprising:
installing a second counting rule in the web application layer proxy, wherein the second counting rule specifies a set of parameters based upon which to create counters, wherein the set of parameters specified by the second counting rule is different from the set of parameters specified by the first counting rule.

6. The method of claim 5, wherein a parameter value from the set of parameter values associated with the first web application layer request is only determined once for the first web application layer request even when the set of parameters specified by the second counting rule includes a parameter corresponding to the parameter value that is also included in the set of parameters specified by the first counting rule.

7. The method of claim 1, wherein the first counter is stored in a hash table using a key that is generated based on the set of parameter values associated with the first counter.

8. The method of claim 1, wherein the determining and creating is performed using a thread running on the web application layer proxy that is different from a thread of the web application layer proxy that applies security rules.

9. The method of claim 1, wherein the first counting rule is installed in response to receiving a request to install the first counting rule.

10. The method of claim 9, wherein the first counting rule is installed while the web application layer proxy is in operation.

11. A set of one or more non-transitory machine-readable storage media storing instructions which, when executed by one or more processors of one or more network devices implementing a web application layer proxy that is communicatively coupled between one or more web application clients and one or more web application servers, causes the one or more network devices to perform operations for dynamically creating counters during runtime based on actual web application layer requests received by the web application layer proxy, the operations comprising:

installing a first counting rule in the web application layer proxy, wherein the first counting rule specifies a set of parameters based upon which to create counters, wherein the set of parameters includes a plurality of parameters;

receiving a first web application layer request generated by one of the one or more web application clients that is intended for one of the one or more web application servers;

determining a set of parameter values associated with the first web application layer request that corresponds to the set of parameters specified by the first counting rule;

creating a first counter associated with the set of parameter values associated with the first web application layer request in response to a determination that a counter associated with the set of parameter values associated with the first web application layer request does not exist; and installing a security rule in the web application layer proxy, wherein the security rule specifies a condition that any single counter created based on the first counting rule exceeds a threshold value and specifies a corresponding action to perform if the condition is satisfied, wherein the condition refers to the first counting rule using a name assigned to the first counting rule.

12. The set of one or more non-transitory machine-readable storage media of claim 11, wherein the operations further comprise:

receiving a second web application layer request generated by one of the one or more web application clients that is intended for one of the one or more web application servers;

determining a set of parameter values associated with the second web application layer request that corresponds to the set of parameters specified by the first counting rule; and updating the first counter in response to a determination that the set of parameter values associated with the second web application layer request is the same as the set of parameter values associated with the first counter or creating a second counter associated with the set of parameter values associated with the second web application layer request in response to a determination that a counter associated with the set of parameter values associated with the second web application layer request does not exist.

13. The set of one or more non-transitory machine-readable storage media of claim 11, wherein the operations further comprise:
providing one or more counters that were created based on the first counting rule, including the first counter, to a security center for analysis.

14. The set of one or more non-transitory machine-readable storage media of claim 11, wherein the set of parameters specified by the first counting rule includes one or more of: site ID, origin geolocation, destination geolocation, client type, proxy ID, Secure Sockets Layer (SSL) version, attack type, security rule ID, and point of presence (PoP) name.

15. A network device configured to implement a web application layer proxy that is to be communicatively coupled between one or more web application clients and one or more web application servers, wherein the web application layer proxy is configured to dynamically create counters during runtime based on actual web application layer requests received by the web application layer proxy, the network device comprising:
one or more processors; and
a non-transitory machine-readable storage medium having instructions stored therein, which when executed by the one or more processors, causes the network device implementing the web application layer proxy to:

install a first counting rule in the web application layer proxy, wherein the first counting rule specifies a set of parameters based upon which to create counters, wherein the set of parameters includes a plurality of parameters, receive a first web application layer request generated by one of the one or more web application clients that is intended for one of the one or more web application servers, determine a set of parameter values associated with the first web application layer request that corresponds to the set of parameters specified by the first counting rule, create a first counter associated with the set of parameter values associated with the first web application layer request in response to a determination that a counter associated with the set of parameter values associated with the first web application layer request does not exist, and install a security rule in the web application layer proxy, wherein the security rule specifies a condition that any single counter created based on the first counting rule exceeds a threshold value and specifies a corresponding action to perform if the condition is satisfied, wherein the condition refers to the first counting rule using a name assigned to the first counting rule.

16. The network device of claim 15, wherein the instructions, when executed by the one or more processors, further causes the network device implementing the web application layer proxy to:

receive a second web application layer request generated by one of the one or more web application clients that is intended for one of the one or more web application servers, determine a set of parameter values associated with the second web application layer request that corresponds to the set of parameters specified by the first counting rule, and update the first counter in response to a determination that the set of parameter values associated with the second web application layer request is the same as the set of parameter values associated with the first counter or create a second counter associated with the set of parameter values associated with the second web application layer request in response to a determination that a counter associated with the set of parameter values associated with the second web application layer request does not exist.

17. The network device of claim 15, wherein the instructions, when executed by the one or more processors, further causes the network device implementing the web application layer proxy to:

install a second counting rule in the web application layer proxy, wherein the second counting rule specifies a set of parameters based upon which to create counters, wherein the set of parameters specified by the second counting rule is different from the set of parameters specified by the first counting rule.

* * * * *